(12) United States Patent
Herl

(10) Patent No.: US 10,465,651 B2
(45) Date of Patent: Nov. 5, 2019

(54) WELL-BORE GENERATOR

(71) Applicant: Disposal Power Systems Inc, Hays, KS (US)

(72) Inventor: Drue Herl, Hays, KS (US)

( * ) Notice: Subject to any disclaimer, the term of this patent is extended or adjusted under 35 U.S.C. 154(b) by 0 days.

(21) Appl. No.: 15/590,413

(22) Filed: May 9, 2017

(65) Prior Publication Data

US 2018/0149133 A1     May 31, 2018

Related U.S. Application Data

(60) Provisional application No. 62/426,743, filed on Nov. 28, 2016, provisional application No. 62/437,913, filed on Dec. 22, 2016, provisional application No. 62/443,252, filed on Jan. 6, 2017.

(51) Int. Cl.

| | |
|---|---|
| *F03B 17/06* | (2006.01) |
| *E21B 43/16* | (2006.01) |
| *F03B 13/10* | (2006.01) |
| *F03G 7/04* | (2006.01) |
| *H02K 7/18* | (2006.01) |
| *F03B 13/02* | (2006.01) |

(52) U.S. Cl.
CPC .......... *F03B 17/061* (2013.01); *E21B 43/162* (2013.01); *F03B 13/02* (2013.01); *F03B 13/10* (2013.01); *F03G 7/04* (2013.01); *H02K 7/1807* (2013.01); *Y02E 10/28* (2013.01)

(58) Field of Classification Search
CPC .......... F03B 17/061; F03B 13/10; F03G 7/04; H02K 7/1807
See application file for complete search history.

(56) References Cited

U.S. PATENT DOCUMENTS

| | | | | |
|---|---|---|---|---|
| 4,492,083 A | * | 1/1985 | McCabe | ................. F03G 7/04 165/45 |
| 4,644,203 A | * | 2/1987 | Thomas | ............... H02K 7/1807 290/53 |
| 5,839,508 A | * | 11/1998 | Tubel | ................. E21B 41/0085 166/65.1 |
| 5,959,380 A | | 9/1999 | Gillett et al. | |
| 8,033,328 B2 | | 10/2011 | Hall et al. | |
| 8,638,004 B2 | | 1/2014 | Badger | |
| 2002/0180215 A1 | | 12/2002 | Mitchell | |

(Continued)

FOREIGN PATENT DOCUMENTS

| | | |
|---|---|---|
| RU | 2105191 C1 | 2/1998 |
| RU | 2261996 C1 | 9/1999 |

(Continued)

OTHER PUBLICATIONS

PCT Patent Application PCT/US2017/063370 International Search Report and Written Opinion dated Nov. 28, 2017, 7 pages.

*Primary Examiner* — Sean Gugger
(74) *Attorney, Agent, or Firm* — Erise IP, P.A.

(57) ABSTRACT

Disclosed is a system for generating energy. The system is incorporated into a disposal or injection well. A conduit is extended down in the well from the surface. Water disposed in the well is used to drive some sort of mechanical-energy creating device that has an axis that runs up the wellbore. The device is used to turn a shaft that extends up in the well, and is used to either generate electrical power, or be used for some mechanical purpose outside the wellbore.

17 Claims, 5 Drawing Sheets

(56) References Cited

U.S. PATENT DOCUMENTS

| | | | | |
|---|---|---|---|---|
| 2007/0194948 A1* | 8/2007 | Hall | ................... | E21B 17/003 340/854.8 |
| 2008/0047753 A1* | 2/2008 | Hall | ................... | E21B 41/0085 175/57 |
| 2010/0133833 A1* | 6/2010 | Williams | ................... | E21B 4/02 290/50 |
| 2010/0320771 A1* | 12/2010 | Urch | ................... | F03B 17/061 290/55 |
| 2011/0115230 A1* | 5/2011 | Urch | ................... | F03B 17/061 290/54 |
| 2012/0091711 A1* | 4/2012 | Badger | ................... | F03B 13/02 290/43 |
| 2012/0117967 A1* | 5/2012 | Loveday | ................... | E21B 36/003 60/641.2 |
| 2012/0124005 A1* | 5/2012 | Eagan | ................... | G06F 17/30389 707/673 |
| 2012/0139250 A1* | 6/2012 | Inman | ................... | E21B 21/10 290/52 |
| 2012/0190598 A1* | 7/2012 | McCubbins, Jr. | ................... | C09K 8/032 507/270 |
| 2013/0180708 A1* | 7/2013 | Ware | ................... | E21B 43/2406 166/246 |
| 2013/0192816 A1* | 8/2013 | Wiggs | ................... | E21B 43/24 166/57 |
| 2017/0130703 A1* | 5/2017 | Muir | ................... | F03G 7/04 |

FOREIGN PATENT DOCUMENTS

| | | |
|---|---|---|
| RU | 2426875 C1 | 8/2011 |
| WO | 2012054512 A1 | 4/2012 |

* cited by examiner

WELL-BORE GENERATOR

BACKGROUND OF THE INVENTION

1. Field

The disclosed embodiments relate generally to the field of energy generation. More specifically, the embodiments relate to the field of hydroelectrically-generated power.

2. Description of the Related Art

Historically, power has been generated using land-based gas turbines, steam turbines, as well as hydroelectric power plants. In a hydroelectric plant, water depth creates pressures at depths in a body of water to power a turbine to generate electricity. A dammed body of water can be used as a source of potential energy.

It is also known to use a water source, e.g., a body of water like a lake, stream, ocean, or shallow well to another second deeper well. Upon falling into the relatively deep well, a submersed electrical generator turbine is used to generate electrical current underground. After it has been used, the water tapped into is delivered into, e.g., an aquifer.

SUMMARY

Disclosed embodiments include a system that is used in a wellbore. It is disposed in the internal casing. A fluid-delivery system is configured to receive a fluid from a fluid source, and deliver the fluid into an upper portion of a conduit. The conduit is being coaxially inside, and extending down into the internal casing. A coaxial space is defined between an outside surface of the conduit and inside surfaces of the internal casing, and a sealing member exists in the coaxial space and allows the fluid to enter into the formation once the fluid has passed through the conduit. Alternatively, the fluid can be disposed of without passing through a sealing device in areas that regulations allow for such designs. A fluid-receiving device is located inside the conduit, and uses the fluid delivered to create rotational mechanical energy. A mechanical-energy utilization system is used to use the rotational mechanical energy created in a location outside of the wellbore, either directly for mechanical applications, or instead, by converting the rotational mechanical energy to generate electricity. In some embodiments, the fluid-receiving device is a helical rotor. In others, it includes an impeller, which imparts rotation into a shaft that extends up in the wellbore to the surface level where the rotational mechanical energy is converted into electrical energy. In other embodiments, the mechanical energy is converted into electrical energy inside the wellbore, and then delivered to the surface area using an electrical conduit.

In some embodiments, the mechanical energy in the shaft is directly introduced into and directly drives a generator—more specifically, the generator operates on substantially the same rotational axis as the shaft. In other embodiments, a rotational-energy-transfer system receives the shaft, and drives the generator, which is operating on a different rotational axis than the shaft.

In some embodiments, the upper part of the internal casing is coaxially included inside a primary casing lined with concrete. Then the rod extends up into a well head before encountering the generator. Also in these embodiments, the coaxial space above the sealing member is filled with packer fluid. The packer fluid is prevented from entering the formation by the sealing member.

In other embodiments, a system creates energy using a wellbore made into a formation to a depth below a ground water level. This system includes a fluid-receiving device that is located in the wellbore. The fluid receiving device receives fluid and the fluid travels down inside a conduit, where it is used to create rotational mechanical energy inside the wellbore, and then utilize that energy for some purpose. The mechanical-energy utilization system can be (i) a mechanical to electrical conversion device for converting the mechanical energy into electrical power for consumption; or (ii) a mechanical energy consumption arrangement configured to use the rotational mechanical energy created in the wellbore in a location outside the wellbore. The conduit has an outlet which, when it releases fluid, is prevented from expanding into the ground water level of the formation.

Disclosed embodiments also can be expressed as a method. More specifically, a method for generating energy by (i) selecting a disposal or injection well made into a formation, (ii) extending a conduit down the well, (iii) locating a mechanical-energy creating device in the conduit to create mechanical rotation of a shaft in the conduit, and (iv) generating electrical energy using the mechanical rotation of the shaft for use outside of the well.

BRIEF DESCRIPTION OF THE DRAWINGS

Illustrative embodiments are described in detail below with reference to the attached drawing figures, which are incorporated by reference herein and wherein.

DETAILED DESCRIPTION

Figure 1:
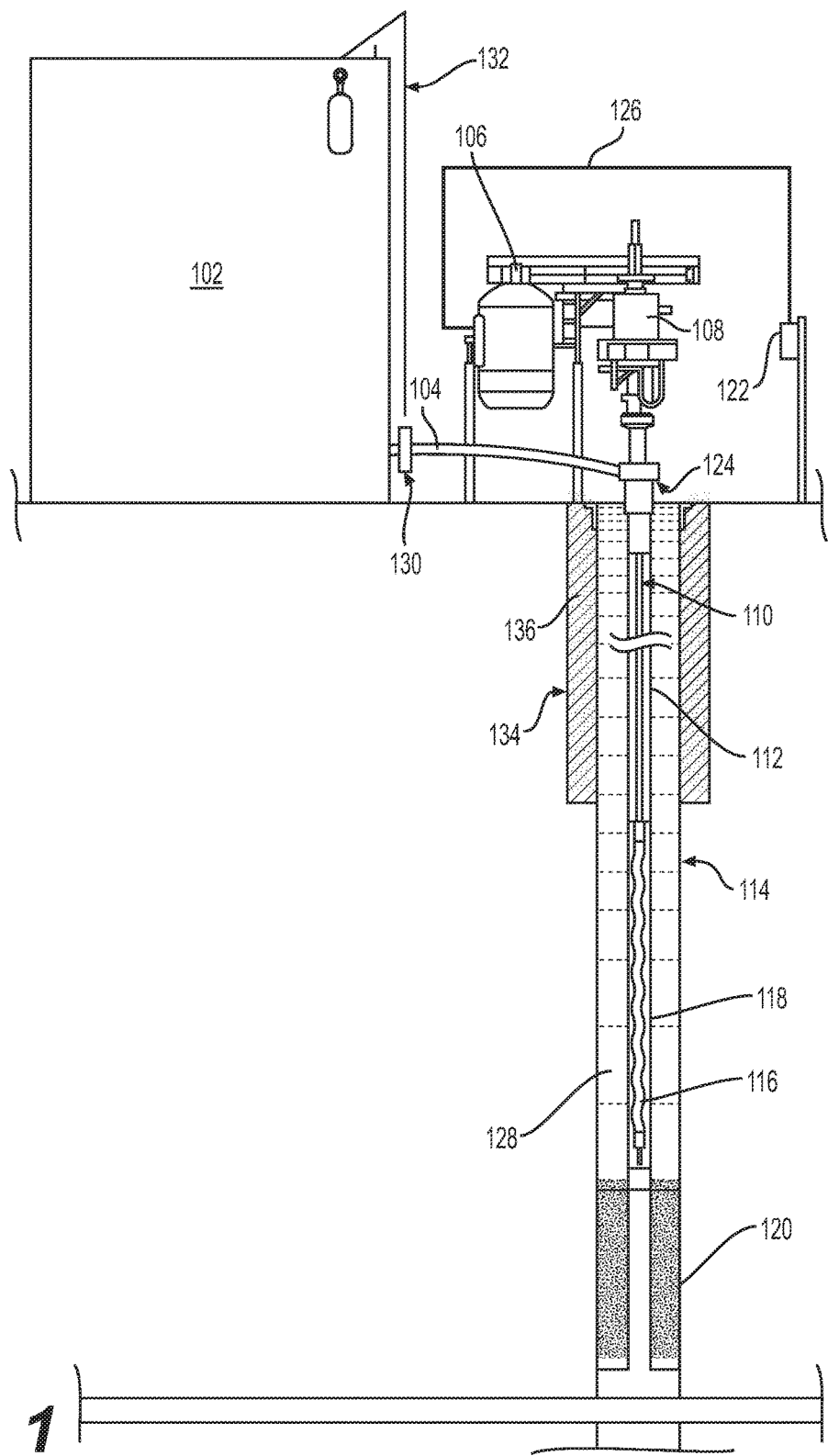
FIG. 1 is a schematic view showing a screw style pump system embodiment incorporated into a well bore with a drive head.

Embodiments provide systems and a method for generating mechanical and/or electrical power by installing an energy-conversion device in a well bore.

In embodiments, a wellbore hydroelectric power generation system including a fluid-receiving mechanical device capable of converting fluid flow into rotational mechanical energy, e.g., a turbine. In embodiments, the turbine (or pump operated in reverse as a fluid receiver instead of driver) is inserted into the wellbore. In some embodiments, the wellbore selected may be one that is devoted to the disposal or injection of a fluid into an underground formation or cavity. When fluid is introduced into the wellbore (e.g., in a disposal), it travels down to the position of a fluid-receiving device, builds up to a height, and then uses the hydraulic energy existing to create rotational mechanical energy as the fluid-receiving device rotates.

The fluid existing immediately above the fluid-receiving device is at high pressures due to the height of the column of fluid created above in the wellbore. This enables the fluid-receiving device to rotate the rod with considerable power. The rotational energy created can be used to mechanically power items outside the wellbore, or to generate electrical power, which is then delivered for external consumption. This, in embodiments, can involve the use of a subterranean power generation device attached to the turbine in the wellbore and an electrical cable run to the surface, or the use of a rod extending up and out of the wellbore to the surface and there used to deliver mechanical power or to turn a generator for the purpose of generating electrical power, or for other mechanical energy consumption at the surface.

In embodiments, the fluid-receiving device can be a device that is normally operated as a pump, e.g., a screw style pump, or turbine style pump. Those skilled in the art will recognize that these sorts of pumps are well known for utilization in receiving energy for the purpose of moving fluids. Here, however, each of these devices is operated to take the potential energy in the column of fluid above it in a well, and generate power. Thus, the energy-conversion goes from hydrostatic to mechanical rotation (hydrostatic turbine operation) rather than from rotating mechanical to hydrostatic (as in pumping).

Four separate embodiments are disclosed in FIGS. 1, 2, 3, and 4 respectively. It should be noted that these figures are not drawn to scale, and that the wellbore arrangements shown would actually have far greater depth than what is depicted. Referring first to the arrangement shown in FIG. 1 a screw style pump system with a drive head is disclosed. The FIG. 1 system includes a water holding tank 102, a water line 104, a generator 106, a drive head 108, a rod 110 (which in many cases comprises what is referred to as a "rod string" where a number of longitudinally aligned vertical segments are attached vertically one on top of the other to form a single rod) into the generator 106, a conduit, e.g., tubing 112, an internal casing 114. This casing is commonly referred to as well casing, a helical rotor 116 and a stator 118, which together in combination make up a screw style pump, a seal 120, commonly referred to as a packer into which the lower end of the conduit/tubing 112 is secured, an electrical switchboard 122, a wellhead 124, an electrical conduit 126, a fluid 128, commonly referred to as packer fluid, a valve 130, a float control device 132 which is attached to the valve, a primary casing 134, commonly referred to as surface casing, and cement 136 that fills the void between the primary casing and the well casing.

In operation, when a fluid source is intended for disposal in the well, the fluid (e.g., a water byproduct) is released from the holding tank 102 through water line 104. Those skilled in the art will recognize that when a water level in the tank 102 reaches a level which causes a float device 132 to rise causing a linkage to open up a valve 130 releasing fluid (e.g., water) through line 104 into the wellhead 124. Alternatively, the valve 130 could be controlled electronically instead of mechanically. From the wellhead 124, the fluid passes down through a coaxial space defined between the rod 110 and the internal surfaces of the tubing 112.

Far below the surface, in the depths of the well, the fluid encounters, and then forms a column of fluid above the helical rotor 116 which is located inside a stator 118, which together in combination make up a screw style pump. Those skilled in the art will recognize that with a screw-style pump like the one shown in FIG. 1, the helical rotor and stator together consist of multiple cavities. Each cavity is used to lift fluid, and each cavity is a stage. Here, the helical rotor and stator are used to receive the hydrostatic pressure made available by the fluid flow down the wellbore.

The height of the column of fluid creates considerable pressure, which drives the helical rotor 116, inside the stator 118. The rotor 116 is mechanically connected to a rod 110. Again, there is no requirement that rod 110 be completely linear, or be cylindrical, unless otherwise specified, and it may comprise different rod segments, etc. Thus, the use of the term "rod" is in essence any substantially rigid longitudinally-extended member capable of possessing mechanical energy which can be transmitted. The term should not be interpreted as requiring any particular configuration unless otherwise specified. Rod 110, which extends up out of the internal casing 114, rotates at the wellbore's center axis. At an upper end, the rod 110 turns the drive head 108, which receives the mechanical energy received from the rod 110 extending up from the well, and uses a rotational-energy-transfer system to transfer the mechanical energy to a generator 106. The drive head 108 (which can include pulleys, and/or gears, etc.) enables generator 106 to be operated on a different rotational axis than that of rod 110. The generator 106 has a shaft which extends down into generator 106, and the rotation of the shaft inside the generator 106 creates electrical power. The electricity generated is conducted via an electrical conduit 126 to the electrical switchboard 122, where the power can be returned to the grid (not shown) for credit, used remotely, or used for some other purpose locally.

It should be noted, that although the FIG. 1 embodiment discloses the mechanical energy drawn from the well being converted into electricity, other embodiments involve the use of the mechanical energy being used above the surface for some other purpose (e.g., pumping water, operating machinery, or some other purpose).

Upon exiting the stator 118, the fluid continues downward through an axial aperture made through the center of a seal 120. Devices like seal 120 are commonly referred to as packers. Once the fluid passes through the seal aperture, it eventually reaches the desired disposal depth which is below the seal, and enters into the surrounding formation. The seal provides separation between the upper and lower portions of the wellbore, and also prevents fluid from flowing up the wellbore in the space between the tubing 112 and the casing 114. The coaxial space above seal 120 that is defined between the exterior surfaces of the tubing 112 and the internal surfaces of the casing is filled with fluid 128, which is commonly referred to as packer fluid. Thus, the seal 120 also prevents the packer fluid from leaking into the formation below. The packer fluid provides hydrostatic pressure in order to lower differential pressure across the seal 120, lower differential pressure on the wellbore, and protect the casing and tubing from corrosion.

Because the axial aperture through the seal 120 is the only way for the fluid (e.g., waste water) to exit below, the system is sealed off, and the water has to pass through the mechanical-energy-creating turbine screw-type pump. Also, the depth of the conduit 110 is sufficient that the fluid exiting through the aperture is released below the level of ground or fresh water at that location to avoid contamination.

In addition to the internal casing 114 the wellbore can also make use of a primary casing 134, which is commonly referred to as surface casing. Often, the space between the primary casing and the surface casing is filled with cement 136. The purpose of the primary casing 134 and cement 136 (concrete) is to aid in the protection of ground or fresh water, so the primary casing 134 typically extends down to a point below the ground or fresh water in the area.

Figure 2:
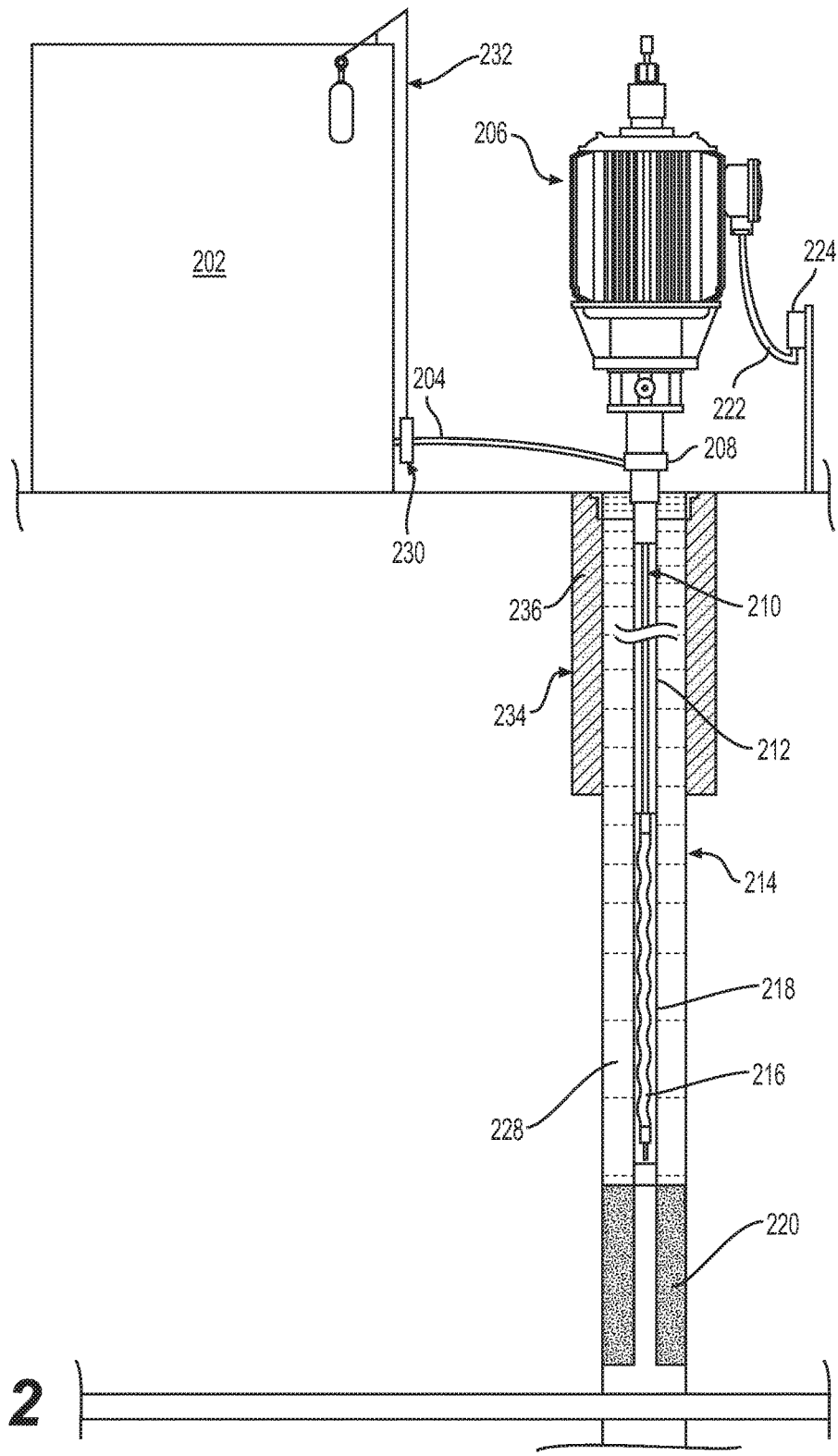
FIG. 2 is a schematic view showing a screw style pump system embodiment incorporated into a well bore with a direct drive.

The embodiment disclosed in FIG. 2 is fairly similar to the one already discussed regarding FIG. 1. For example, the FIG. 2 embodiment includes a water holding tank 202, a water line 204, a well head 208, a rod 210, a tubing 212, an internal casing 214, commonly referred to as well casing, a helical rotor 216 and a stator 218, which together in combination make up a screw style pump, a seal 220, commonly referred to as a packer, an electrical conduit 222, an electrical switchboard 224, a fluid 228, commonly referred to as packer fluid, a valve 230, a float control device 232 which is attached to the valve, a primary casing 234, commonly referred to as surface casing, and cement 236 that fills the void between the primary casing and the well casing. Here, however, a direct drive arrangement enables a generator 206 to be driven on the same axis as the rod 210 extending out of the wellbore. This enables operation without the need for a mechanical arrangement to transfer the mechanically energy onto another axis.

In operation, like with the FIG. 1 embodiment, when a fluid source is intended for disposal in the well, the fluid (e.g., a water byproduct) is released from the holding tank 202 through water line 204, which has a valve 230, which is connected to a float control device 232, and then drops into the wellhead 208. From the wellhead 208, the fluid passes down through a coaxial space defined between the rod 210 and the internal surfaces of the tubing 212.

Far below the surface, in the depths of the well, the fluid encounters, and then forms a column of fluid above the helical rotor 216 which is inside a stator 218, which together in combination make up a screw style pump. Those skilled in the art will recognize that a screw style pump includes a helical rotor and stator which consists of multiple cavities. Each cavity is used to lift fluid, each cavity is a stage. In normal practice the helical rotor is driven to pump fluid up and out of the wellbore, but here, the helical rotor and stator are used to receive the hydrostatic pressure made available by the fluid flow down the wellbore.

The height of the column of fluid creates considerable pressure, which drives the helical rotor 216, inside the stator 218, which is mechanically connected to the rod 210. Rod 210, which extends up out of the casing 214, rotates at the wellbore's center axis. At an upper end, the rod 210 turns the direct drive 206, which is commonly referred to as a permanent magnet motor drive. Those skilled in the art will recognize that a permanent magnet motor drive consists of a hollow rotor that accepts and attaches to the rod 210 and rotates inside a stator. In normal practice the permanent magnet motor drive is used to apply rotational energy to a pump and drive fluid out of a wellbore, but here, the permanent magnet motor drive head is driven by the rotation of the rod 210 that is created by the helical rotor 216 inside the stator 218 which causes it to generate electricity. The electricity generated is conducted via an electrical conduit 222 to the electrical switchboard 224, where the power can be returned to the grid (not shown) for credit, used remotely, or used for some other purpose locally.

Upon exiting the stator 218, the fluid continues downward through an axial aperture made through a seal 220, which is commonly referred to as a packer, and eventually reaches the desired disposal depth which is below the seal. The seal provides separation between the upper and lower portions of the wellbore and also prevents fluid from flowing up the wellbore in the space between the tubing 212 and the internal casing 214. The coaxial space defined between the tubing 212, and the internal surfaces of the casing is filled with fluid 228, which is commonly referred to as packer fluid. This fluid can provide hydrostatic pressure in order to lower differential pressure across the seal 220, lower differential pressure on the wellbore, and protect the casing and tubing from corrosion.

In addition to the internal casing 214 the wellbore can also make use of a primary casing 234, which is commonly referred to as surface casing. Often times the space between the primary casing and the surface casing is filled with cement 236. The purpose of the primary casing 234 and cement 236 is to aid in the protection of ground or fresh water, so the primary casing is typically sat to a point below the ground or fresh water in the area.

Figure 3:
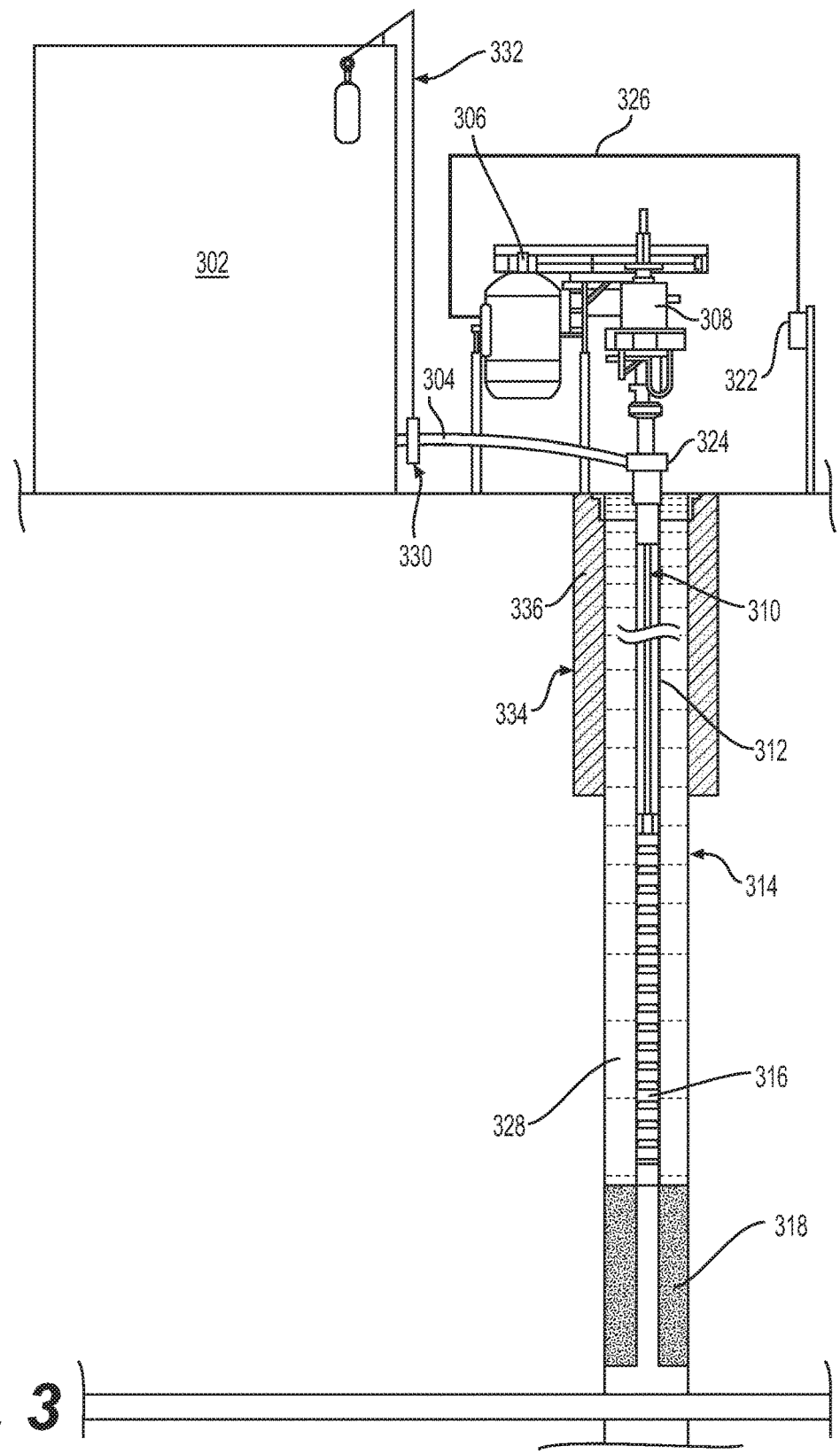
FIG. 3 is a schematic view showing a turbine style pump system embodiment incorporated into a well bore with a drive head.

The embodiment disclosed in FIG. 3 is fairly similar to the one already discussed regarding FIG. 1. For example, the FIG. 3 embodiment includes a water holding tank 302, a water line 304, a generator 306, a drive head 308, a rod 310, a tubing 312, an internal casing 314, commonly referred to as well casing, a turbine style pump 316, a seal 318, commonly referred to as a packer, an electrical switchboard 322, a wellhead 324, an electrical conduit 326, a fluid 328, commonly referred to as packer fluid, a valve 330, a float control device 332 which is attached to the valve, a primary casing 334, commonly referred to as surface casing, and cement 336 that fills the void between the primary casing and the well casing.

In operation, when a fluid source is intended for disposal in the well, the fluid (e.g., a water byproduct) is released from the holding tank 302 through water line 304, which has a valve 330, which is connected to a float control device 332, and then drops into the wellhead 324. From the wellhead 324, the fluid passes down through a coaxial space defined between the rod 310 and the internal surfaces of the tubing 312.

Far below the surface, in the depths of the well, the fluid encounters, and then forms a column of fluid above the turbine style pump 316. Those skilled in the art will recognize that a turbine style pump often comprises an impeller attached to a shaft inside a housing. Each impeller and housing are used to lift fluid, each impeller and housing is a stage. Here, the arrangement is used to receive the hydrostatic pressure made available by the fluid flow and depth created down the wellbore.

The height of the column of fluid creates considerable pressure, which drives the turbine style pump 316, which is mechanically connected to the rod 310. Rod 310, which extends up out of the internal casing 314, rotates at the wellbore's center axis. At an upper end, the rod 310 turns the drive head 308, which is coupled to a generator 306, which generates electrical power. The electricity generated is conducted via an electrical conduit 326 to the electrical switchboard 322, where the power can be returned to the grid (not shown) for credit, used remotely, or used for some other purpose locally.

Upon exiting the turbine style pump 316, the fluid continues downward through a seal 318, which is commonly referred to as a packer, and eventually reaches the desired disposal depth which is below the seal. The seal provides separation between the upper and lower portions of the wellbore and also prevents fluid from flowing up the wellbore in the space between the tubing 312 and the internal casing 314. The coaxial space defined between the tubing 312, and the internal surfaces of the casing is filled with fluid 328, which is commonly referred to as packer fluid. This fluid can provide hydrostatic pressure in order to lower differential pressure across the seal 318, lower differential pressure on the wellbore, and protect the casing and tubing from corrosion.

In addition to the internal casing 314 the wellbore can also make use of a primary casing 334, which is commonly referred to as surface casing. Often times the space between the primary casing and the surface casing is filled with cement 336. The purpose of the primary casing 334 and cement 336 is to aid in the protection of ground or fresh water, so the primary casing is typically sat to a point below the ground or fresh water in the area.

Figure 4:
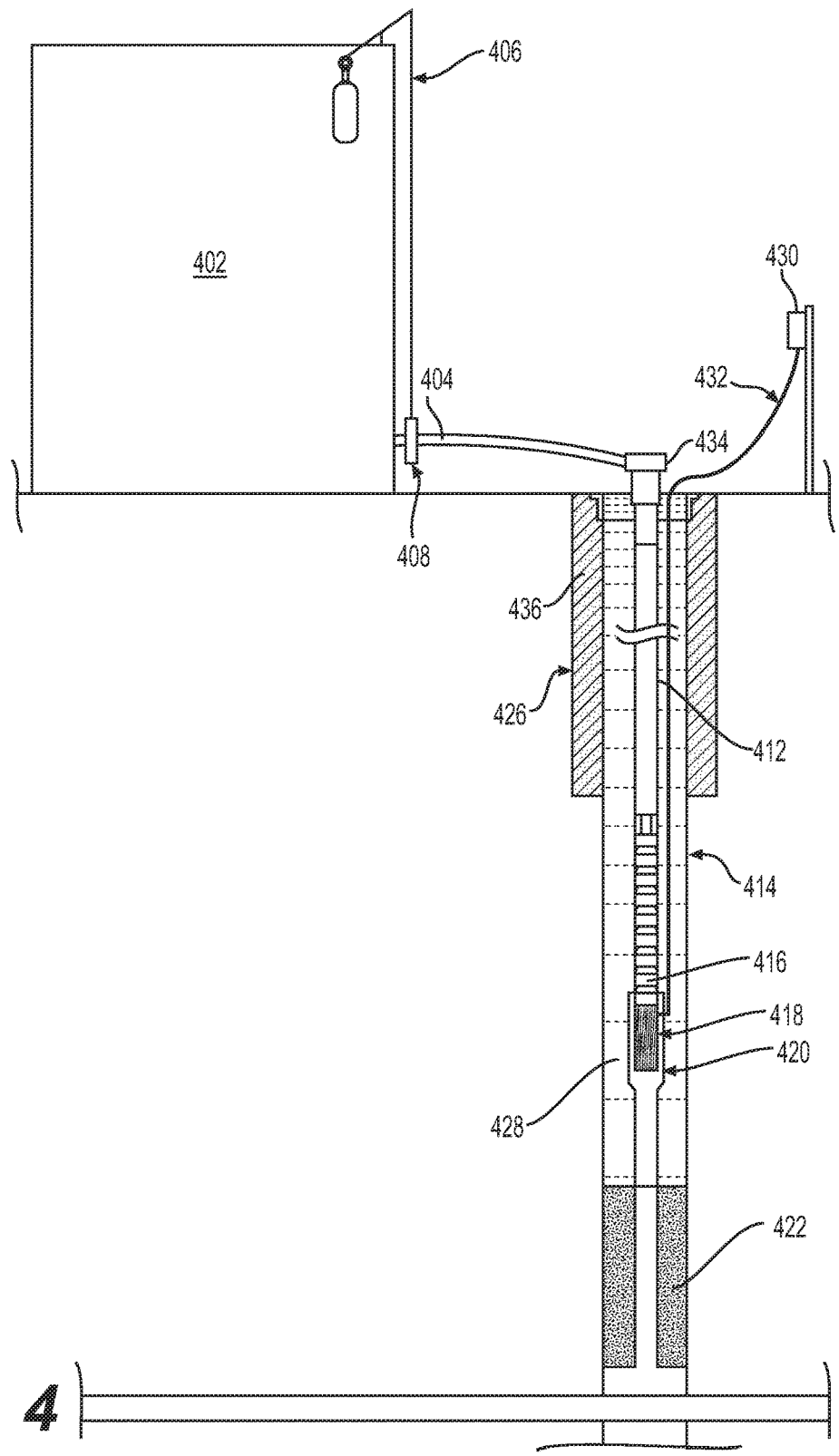
FIG. 4 is a schematic view showing a turbine style pump system embodiment incorporated into a well bore with a mechanical to electrical conversion device located below it.

The embodiment of FIG. 4 is different in that it discloses an arrangement where the conversion of mechanical to electrical energy occurs underground. In this embodiment, fluid contained in a fluid holding tank 402 travels via a water line 404, which has a valve 408, which is connected to a float control device 406, and then drops into the wellhead 434 as has occurred in past embodiments. Here, however, there is no rod disposed up along the center access of the wellbore. Instead, water introduced into the tubing 412 travels down to where it encounters a turbine style pump 416 (being operated in reverse), and then forms a column of fluid above the turbine style pump 416, which is coupled with a motor 418, that serves as a mechanical to electrical conversion device.

Those skilled in the art will recognize that a turbine style pump 416 often comprises an impeller attached to a shaft inside a housing. Each impeller and housing are used to lift fluid, each impeller and housing is a stage. In normal practice they are driven to pump fluid up and out of the wellbore, but here, the turbines are used to receive the hydrostatic pressure made available by the fluid flow down the wellbore.

The height of the column of fluid creates considerable pressure, which drives the turbine style pump 416, which is mechanically connected to the motor 418. The motor 418, which unlike the embodiments disclosed in FIGS. 1-3, is located in the wellbore. The motor serves as a mechanical to electrical energy conversion device and generates electrical power. The electricity generated is conducted via an electrical conduit 432 to the electrical switchboard 430, where the power can be returned to the grid (not shown) for credit, used remotely, or used for some other purpose locally.

Upon exiting the turbine style pump 416, the fluid the fluid continues downward into a housing 420 that is attached to the outlet of the turbine style pump and allows the fluid to flow around the motor 418. Upon exiting the housing 420, the fluid continues downward through a seal 422, which is commonly referred to as a packer, and eventually reaches the desired disposal depth which is below the seal. The seal provides separation between the upper and lower portions of the wellbore and also prevents fluid from flowing up the wellbore in the space between the tubing 412 and the internal casing 414. The coaxial space defined between the tubing 412, and the internal surfaces of the casing is filled with fluid 428, which is commonly referred to as packer fluid. This fluid can provide hydrostatic pressure in order to lower differential pressure across the seal 422, lower differential pressure on the wellbore, and protect the casing and tubing from corrosion.

In addition to the internal casing 414 the wellbore can also make use of a primary casing 426, which is commonly referred to as surface casing. Often times the space between the primary casing and the surface casing is filled with cement 436. The purpose of the primary casing 426 and cement 436 is to aid in the protection of ground or fresh water, so the primary casing is typically sat to a point below the ground or fresh water in the area.

Figure 5:
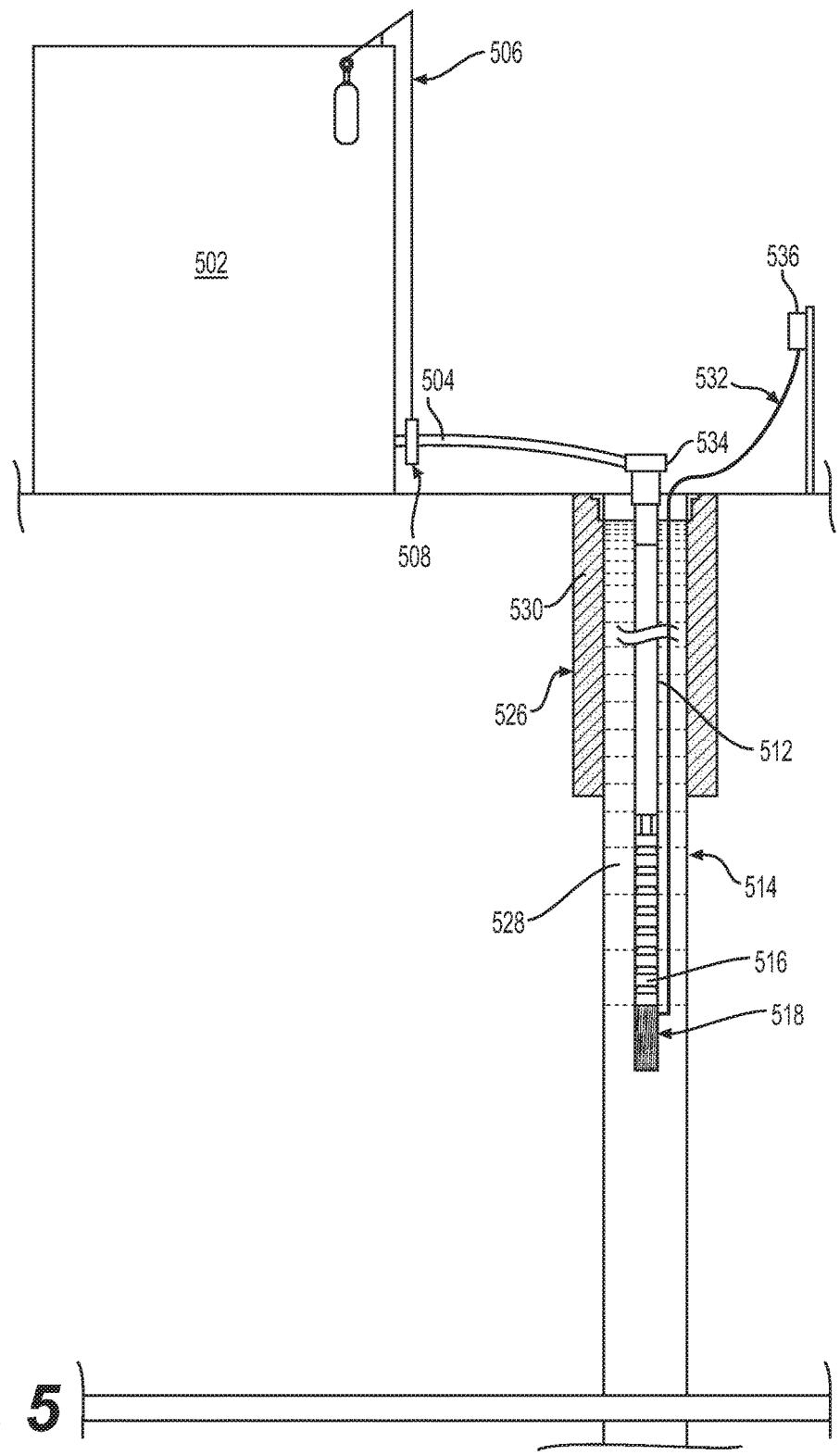
FIG. 5 is a schematic view showing an arrangement where the conversion of mechanical to electrical energy occurs underground in a system that has no sealing device.

The embodiment of FIG. 5 is different in that it discloses an arrangement where the conversion of mechanical to electrical energy occurs underground in a system that has no sealing device, commonly referred to as a packer. In this embodiment, fluid contained in a fluid holding tank 502 travels via a water line 504, which has a valve 508, which is connected to a float control device 506, and then drops into the wellhead 534 as has occurred in past embodiments. Here, however, there is no rod disposed up along the center access of the wellbore, and no sealing device present in the wellbore. Instead, water introduced into the tubing 512 travels down to where it encounters a turbine style pump 516 (being operated in reverse), and then forms a column of fluid above the turbine style pump 516, which is coupled with a motor 518, that serves as a mechanical to electrical conversion device.

Those skilled in the art will recognize that a turbine style pump 516 often comprises an impeller attached to a shaft inside a housing. Each impeller and housing are used to lift fluid, each impeller and housing is a stage. In normal practice they are driven to pump fluid up and out of the wellbore, but here, the turbines are used to receive the hydrostatic pressure made available by the fluid flow down the wellbore.

The height of the column of fluid creates considerable pressure, which drives the turbine style pump 516, which is mechanically connected to the motor 518. The motor 518, which unlike the embodiments disclosed in FIGS. 1-3, is located in the wellbore. The motor serves as a mechanical to electrical energy conversion device and generates electrical power. The electricity generated is conducted via an electrical conduit 532 to the electrical switchboard 536, where the power can be returned to the grid (not shown) for credit, used remotely, or used for some other purpose locally.

Upon exiting the turbine style pump 516, the fluid the fluid continues downward around the motor 518 which assists with the cooling of the motor, and on down to the disposal or injection formation of the well. In previous embodiments the fluid traveled through a sealing device commonly referred to as a packer, in this embodiment the there is no sealing device present. Often times in a system with no sealing device, commonly referred to as a packer less system the coaxial space between the outside of the tubing 512 and the inside of the casing 514 is filled with a corrosion-inhibiting or hydrocarbon liquid 528 that has a specific gravity less than 1.00. This fluid 528 allows for a positive annulus pressure and the monitoring of such, aids in lowering differential pressure on the wellbore, and helps protect the casing and tubing from corrosion.

In addition to the internal casing 514 the wellbore can also make use of a primary casing 526, which is commonly referred to as surface casing. Often times the space between the primary casing and the surface casing is filled with cement 530. The purpose of the primary casing 526 and cement 530 is to aid in the protection of ground or fresh water, so the primary casing is typically sat to a point below the ground or fresh water in the area.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and sub-combinations are of utility and may be employed without reference to other features and sub-combinations and are contemplated within the scope of the claims. Not all steps listed in the various figures need be carried out in the specific order described.

The invention claimed is:

1. A system for use in a wellbore including an internal casing, the internal casing extending down from a location near a surface level, past a ground-water level, and into the wellbore in a formation, the system comprising:
   a fluid-delivery system configured to receive a disposal fluid from a fluid source, and deliver the disposal fluid into an upper portion of a conduit, the conduit being coaxially inside, and extending down from the surface level into the internal casing;
   a valve included in the fluid-delivery system, the valve controlling a rate of flow of the disposal fluid into the conduit and establish a height of a column of disposal fluid above a fluid-receiving device located inside the conduit below the valve;
   a coaxial space defined between an outside surface of the conduit and inside surfaces of the internal casing;
   a sealing member having upper and lower surfaces, the sealing member being located vertically below the valve in the wellbore, the sealing member being in the coaxial space, the conduit passing through the sealing member, an exit opening at a lower end of the conduit, the exit opening allowing for the passage of the fluid into the formation once the fluid has passed through the conduit, the lower surface of the sealing member being positioned such that the lower surface of the sealing member is pressurized by formation fluids existing below the sealing member, the sealing member preventing back flow of hydrocarbons into the coaxial space;
   the fluid-receiving device receiving the fluid and generating rotational mechanical energy at a speed at least in part due to the height of the column of disposal fluid established, the system configured to expel the fluid at a depth substantially below the ground water level;
   a mechanical-energy utilization system, the utilization system configured to use the rotational mechanical energy created in a location outside of the wellbore.

2. The system of claim 1 wherein the fluid-receiving device includes a helical rotor.

3. The system of claim 2 wherein the helical rotor imparts rotation into a shaft which extends up in the wellbore to the surface level where the rotational mechanical energy is converted into electrical energy.

4. The system of claim 1 wherein the fluid-receiving device comprises an impeller.

5. The system of claim 4 wherein the impeller imparts rotation into a shaft which extends up in the wellbore to the surface level where the rotational mechanical energy is converted into electrical energy.

6. The system of claim 4 wherein the rotational mechanical energy created by the impeller is converted into electrical energy at a location in the wellbore below the surface level.

7. The system of claim 6 wherein the electrical energy is delivered from the wellbore to the surface area using an electrical conduit.

8. The system of claim 1 wherein the mechanical-energy utilization system is a generator at the surface level, the generator receiving the rotational-mechanical energy from a shaft that extends up the wellbore from the fluid-receiving device, the shaft being mechanically coupled above-ground to the generator, the generator converting the rotational-mechanical energy into electrical energy for use outside the wellbore.

9. The system of claim 8 wherein the mechanical energy in the shaft is directly introduced into and directly drives the generator, the generator operating on substantially the same rotational axis as the shaft.

10. The system of claim 9 wherein the generator uses a permanent magnet motor drive head which is driven by the rotation of the rod inside of a stator.

11. The system of claim 8 wherein the mechanical energy from the shaft is introduced, above ground, into a rotational-energy-transfer system, the rotational-energy-transfer system driving the generator, the generator operating on a different rotational axis than does the shaft.

12. The system of claim 1 wherein:
   the casing, at an upper portion, is coaxially included inside a primary casing lined with concrete the primary casing extending substantially below the ground water level;
   the rod extends up through a well head before encountering the generator;
   and;
   the coaxial space above the sealing member is filled with packer fluid, the packer fluid applying a downward force onto the sealing member, the downward force being due to the weight of the packer fluid, the downward force acting against an upward force applied to the sealing member minimizing any pressure differential created vertically in the sealing member, the upward force being due to pressures existing in formation fluids below the sealing member.

13. A system for generating energy using a wellbore made into a formation to a depth below a ground water level, the system comprising:
   a fluid source;
   a valve above ground between the fluid source and a fluid-receiving device located in the wellbore, the fluid-receiving device receiving fluid travelling downward inside a conduit inside the wellbore, and generating rotational mechanical energy inside the wellbore, the valve controlling a flow rate of the fluid to set the mechanical energy generated, the valve further being configured to establish a height of a column of the fluid;
   a mechanical-energy utilization system, the utilization system comprising one of: (i) a mechanical to electrical conversion device for converting the mechanical energy into electrical power for consumption; and (ii) a mechanical energy consumption arrangement configured to use the rotational mechanical energy generated in the wellbore for some mechanical application in a location outside the wellbore; and
   a fluid outlet from the conduit, the outlet being located substantially below the ground water level and thus substantially limiting exposure to any ground water, the fluid outlet injecting the fluid into a high-pressure hydrocarbon level in the formation.

14. The system of claim 13 wherein the conduit extends down from a location near a surface level into the wellbore in the formation, and a coaxial space is defined between an outside surface of the conduit and an inside, substantially cylindrical surface of a wellbore casing, the casing and conduit both extending down past the groundwater level into the high-pressure hydrocarbon level in the well, and the coaxial space is sealed off above the fluid outlet.

15. A method for generating energy comprising:
selecting one of a disposal and injection well made into a formation;
extending a conduit down inside the selected well;
locating a mechanical-energy generating device in the conduit to create mechanical rotation of a shaft in the conduit upon the introduction of a waste-water fluid down into the conduit;
establishing a column of the waste-water fluid in the conduit at a location above the mechanical-energy generating device using a valve;
sealing off the well outside of the conduit against an upward force created by hydrocarbon induced pressure in the formation, the sealing off occurring at a vertical position;
controlling the speed of the mechanical-energy generating device by using the valve to determine the height of the column of the waste-water fluid; and
receiving the column of the waste-water fluid through the mechanical-energy generating device when the column of the waste-water fluid has reached a height which establishes hydrostatic pressures sufficient to overcome a hydrocarbon pressure existing below the mechanical-energy generating device; and
generating electrical energy using the mechanical rotation of the shaft for use outside of the selected well.

16. The method of claim 15 comprising:
providing a static column of fluid in a space outside of the conduit above the vertical position to counter the upward force created by the hydrocarbon induced pressure.

17. The method of claim 16 wherein the vertical position is below the mechanical-energy generating device and at or below an outlet at a lower portion of the conduit.

* * * * *